United States Patent
Morinaka (10) Patent No.: US 11,085,541 B2
(45) Date of Patent: Aug. 10, 2021

(54) LABYRINTH SEAL

(71) Applicant: KOBE STEEL, LTD., Hyogo (JP)

(72) Inventor: Shunsuke Morinaka, Hyogo (JP)

(73) Assignee: KOBE STEEL, LTD., Hyogo (JP)

( * ) Notice: Subject to any disclaimer, the term of this patent is extended or adjusted under 35 U.S.C. 154(b) by 0 days.

(21) Appl. No.: 16/340,594

(22) PCT Filed: Sep. 29, 2017

(86) PCT No.: PCT/JP2017/035617
§ 371 (c)(1),
(2) Date: Apr. 9, 2019

(87) PCT Pub. No.: WO2018/070279
PCT Pub. Date: Apr. 19, 2018

(65) Prior Publication Data
US 2019/0234416 A1    Aug. 1, 2019

(30) Foreign Application Priority Data
Oct. 13, 2016  (JP) .............................. JP2016-201949

(51) Int. Cl.
*F16J 15/447*     (2006.01)
*F01D 11/02*     (2006.01)

(52) U.S. Cl.
CPC ........... *F16J 15/4472* (2013.01); *F01D 11/02* (2013.01); *F16J 15/447* (2013.01); *F05D 2240/55* (2013.01)

(58) Field of Classification Search
CPC ...... F01D 11/02; F16J 15/4472; F16J 15/447; F16J 15/3288; F05D 2240/55; F05D 2240/56; F02C 7/28
See application file for complete search history.

(56) References Cited

U.S. PATENT DOCUMENTS 1,756,958 A * 5/1930 Schmidt ................. F01D 11/02
                                             415/131
2,123,818 A * 7/1938 Wegmann ............ F16J 15/4472
                                             277/419

(Continued)

FOREIGN PATENT DOCUMENTS

DE    2931714 A1 *  1/1981  .............. F01D 11/02
EP    2 540 987 A1   1/2013

(Continued)

OTHER PUBLICATIONS

International Search Report issued in PCT/JP2017/035617; dated Jan. 9, 2018.
Written Opinion issued in PCT/JP2017/035617; dated Jan. 9, 2018.

*Primary Examiner* — Nicholas L Foster
(74) *Attorney, Agent, or Firm* — Studebaker & Brackett PC (57) ABSTRACT

A labyrinth seal includes a step portion, a high-puressure-side fin, a low-puressure-side fin and an annular groove. The step portion is formed in a portion of a second member on one side of the facing direction and faces a high-pressure side. The high-pressure-side fin is arranged on a high-pressure side relative to the step portion. The low-pressure-side fin is arranged on a low-pressure side relative to the step portion. The annular groove is formed in a portion of the second member on the one side of the facing direction and is arranged in at least a part of a region on the low-pressure side relative to the step portion as well as on the high-pressure side relative to the low-pressure-side fin.

7 Claims, 8 Drawing Sheets

(56) References Cited

U.S. PATENT DOCUMENTS

| | | | | |
|---|---|---|---|---|
| 3,231,285 A * | 1/1966 | Weltmer | ............... | F16J 15/4472 277/418 |
| 5,029,876 A * | 7/1991 | Orlando | ............... | F16J 15/4472 277/419 |
| 5,244,216 A * | 9/1993 | Rhode | .................. | F16J 15/4472 277/303 |
| 6,168,377 B1 * | 1/2001 | Wolfe | .................. | F01D 11/001 415/174.2 |
| 6,467,773 B1 * | 10/2002 | Rinaldo | ................ | F16J 15/004 277/409 |
| 6,834,860 B2 * | 12/2004 | Rinaldo | ............... | F16J 15/4472 277/418 |
| 8,434,766 B2 * | 5/2013 | Zeng | ....................... | F01D 11/02 277/419 |
| 9,650,907 B2 * | 5/2017 | Bricaud | ................ | F01D 11/02 |
| 10,281,046 B2 * | 5/2019 | Daussin | ............... | F16J 15/4472 |
| 10,557,363 B2 * | 2/2020 | Matsumoto | ............... | F01D 9/02 |
| 10,570,768 B2 * | 2/2020 | Morinaka | ........... | F16J 15/4472 |
| 2003/0030223 A1 * | 2/2003 | Rinaldo | ............... | F16J 15/4472 277/412 |
| 2011/0250073 A1 * | 10/2011 | Neeli | .................... | F01D 11/001 416/223 R |
| 2012/0027582 A1 * | 2/2012 | Natarajan | ............... | F16J 15/46 415/229 |
| 2012/0043728 A1 * | 2/2012 | Zeng | .................... | F16J 15/4472 277/412 |
| 2012/0091662 A1 * | 4/2012 | Neeli | ................... | F16J 15/4472 277/420 |
| 2016/0333714 A1 | 11/2016 | Matsumoto et al. | | |
| 2018/0156337 A1 * | 6/2018 | Daussin | ............... | F16J 15/4472 |
| 2018/0187567 A1 * | 7/2018 | Morinaka | ............... | F01D 11/02 |
| 2018/0355979 A1 * | 12/2018 | Nishikawa | ............... | F01D 5/225 |
| 2019/0048734 A1 * | 2/2019 | Kuwamura | ............. | F01D 11/02 |
| 2019/0048735 A1 * | 2/2019 | Matsumoto | ............ | F16J 15/447 |
| 2019/0072185 A1 * | 3/2019 | Morinaka | ............ | F16J 15/4472 |
| 2019/0136863 A1 * | 5/2019 | Morinaka | ............ | F04D 29/106 |
| 2019/0186637 A1 * | 6/2019 | Morinaka | ............ | F16J 15/4476 |
| 2019/0285183 A1 * | 9/2019 | Morinaka | ............ | F16J 15/4472 |

FOREIGN PATENT DOCUMENTS

| | | |
|---|---|---|
| JP | S51-082855 A | 7/1976 |
| JP | S53-104803 U | 8/1978 |
| JP | S60-098196 A | 6/1985 |
| JP | 2001-032948 A | 2/2001 |
| JP | 2002-228014 A | 8/2002 |
| JP | 2015-169077 A | 9/2015 |

* cited by examiner

LABYRINTH SEAL

TECHNICAL FIELD

The present invention relates to a labyrinth seal.

BACKGROUND ART

A conventional labyrinth seal is disclosed, for example, in Patent Documents 1 and 2. The labyrinth seal prevents a fluid from leaking through a gap between two members (for example, a rotary body and a stationary body) constituting a rotary machine. The labyrinth seal described in FIG. 1 of Patent Document 2 includes a step portion and a plurality of fins. This configuration allows for formation of a vortex in a space between fins and generation of fluid energy loss, thereby reducing the leakage rate of the fluid.

CITATION LIST

Patent Documents

Patent Document 1: JP-A-S60-98196
Patent Document 2: JP-A-2002-228014

SUMMARY OF INVENTION

Technical Problem

The vortex described in FIG. 1 of Patent Document 2 is blown onto a member near a gap between a fin and the member (a rotary body in Patent Document 2). As a result, a fluid easily leaks from the gap between the fin and the member, and a leakage rate of the fluid may not be sufficiently reduced.

Therefore, an object of the present invention is to provide a labyrinth seal capable of reducing the leakage rate of a fluid.

Solution to Problem

The labyrinth seal in the present invention is to be included in a rotary machine. The rotary machine includes a first member, a second member, and a gap. The second member faces the first member. The gap is formed between the first member and the second member and is configured to allow a fluid to flow from a high-pressure side to a low-pressure side in a flow direction that is a direction perpendicular to a direction where the first member and the second member face each other. In a facing direction which is the direction where the first member and the second member face each other, the side of the first member relative to the second member is defined as one side of the facing direction. In the facing direction, the side of the second member relative to the first member is defined as the other side of the facing direction. The labyrinth seal includes a step portion, a high-pressure-side fin, a low-pressure-side fin, and an annular groove. The step portion is formed in a portion of the second member on the one side of the facing direction and faces the high-pressure side. The high-pressure-side fin is arranged on the high-pressure side relative to the step portion and extends from a portion of the first member on the one side of the facing direction toward the other side of the facing direction. The low-pressure-side fin is arranged on the low-pressure side relative to the step portion and extends from a portion of the first member on the one side of the facing direction toward the other side of the facing direction. The annular groove is formed in a portion of the second member on the one side of the facing direction and is arranged in at least a part of a region on the low-pressure side relative to the step portion as well as on the high-pressure side relative to the low-pressure-side fin.

Advantageous Effects of the Invention

The configuration above enables a reduction in the leakage rate of a fluid.

DESCRIPTION OF EMBODIMENTS

First Embodiment

Figure 1:
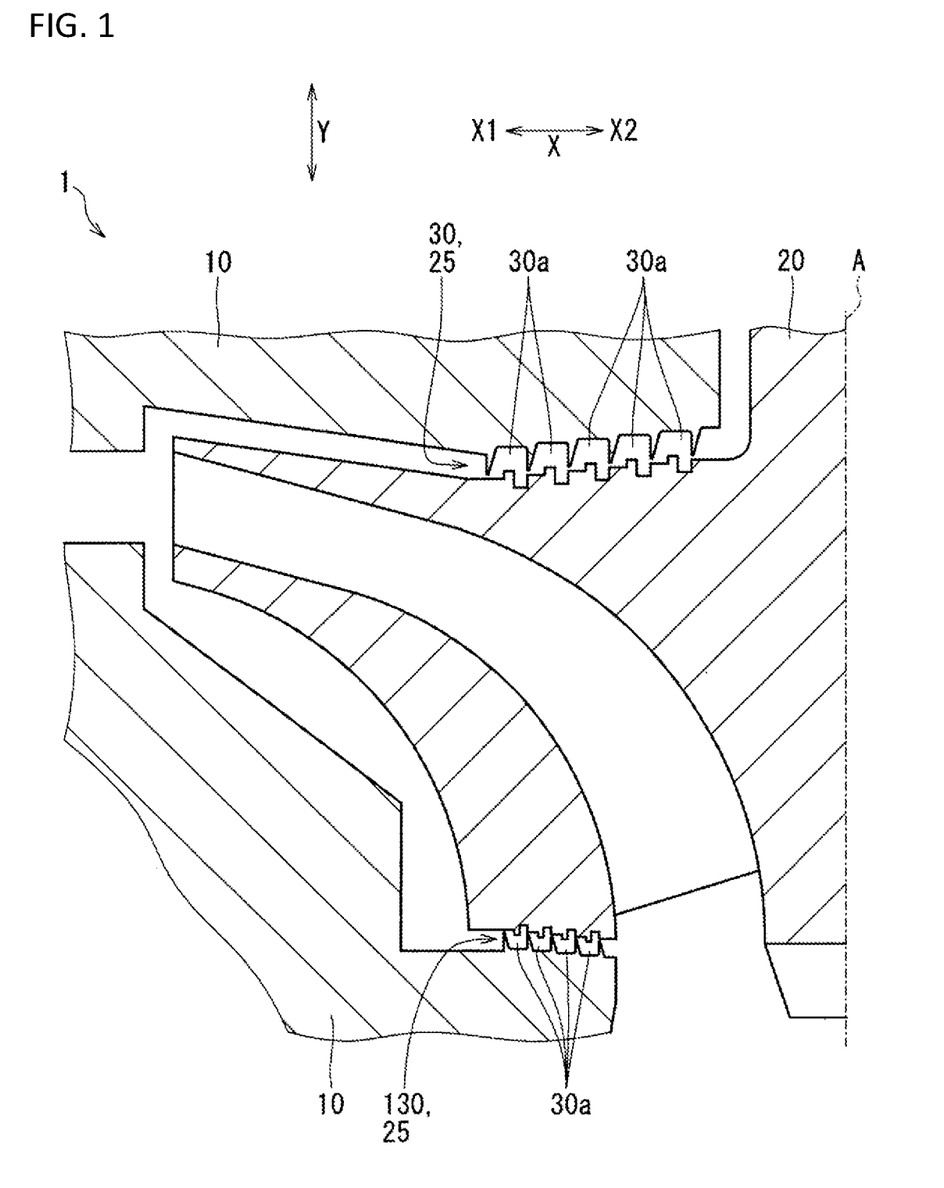
FIG. 1 is a cross-sectional view of a rotary machine according to a first embodiment.

A rotary machine 1 of the first embodiment illustrated in FIG. 1 is described with reference to FIG. 1 to FIG. 4.

The rotary machine 1 (fluid machine, fluid rotary machine) is, for example, a compressor and is, for example, a turbo compressor, or the like. The rotary machine 1 may be, for example, an expander and may be, for example, an expansion turbine or the like. The rotary machine 1 is of centrifugal type. The rotary machine 1 includes a stationary body 10 (first member), a rotary body 20 (second member), a gap 25, a labyrinth seal 30, and a labyrinth seal 130. The stationary body 10 is, for example, a casing. The stationary body 10 may be, for example, a member arranged in a casing and fixed to the casing.

The rotary body 20 is arranged inside the stationary body 10 and rotates around a rotation axis A (central axis) relative to the stationary body 10. The rotary body 20 is, for example, an impeller and is, for example, an impeller with a shroud. The rotary body 20 faces the stationary body 10. The portions in which the labyrinth seal 30 and the labyrinth seal 130 are provided in the rotary body 20 face the stationary body 10.

Figure 2:
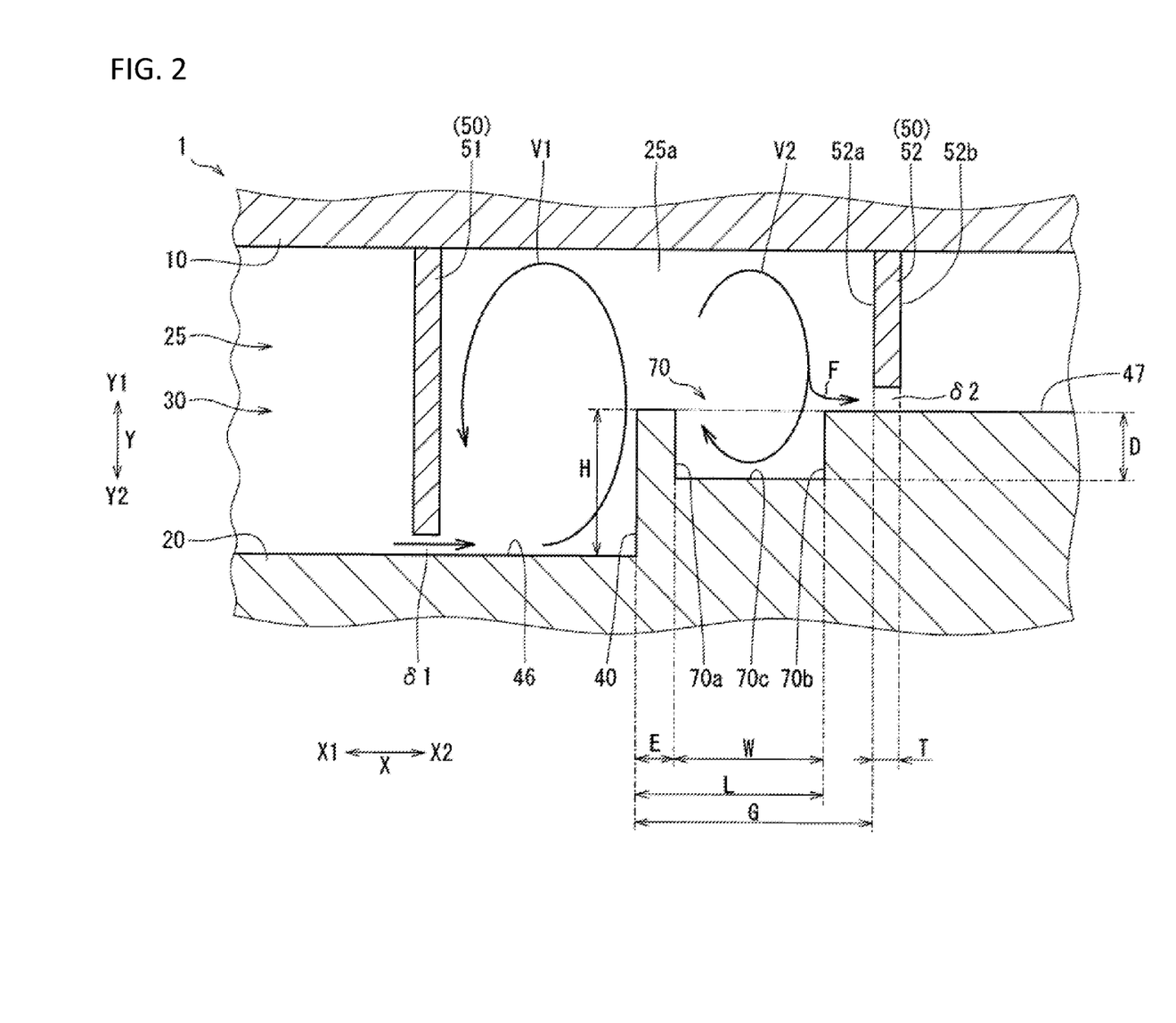
FIG. 2 is a cross-sectional view of a labyrinth seal and the like in FIG. 1.

The gap 25 is, as illustrated in FIG. 2, formed between the stationary body 10 and the rotary body 20 and is formed between the portion of the stationary body 10 on the other side Y2 (described below) of the facing direction and the portion of the rotary body 20 on the one side Y1 (described below) of the facing direction. A fluid can flow through the gap 25. The gap 25 is configured to allow a fluid to flow through the gap 25 from the high-pressure side X1 in the flow direction X to the low-pressure side X2 in the flow direction X. As illustrated in FIG. 1, the flow direction X is a direction perpendicular or approximately perpendicular to the rotation axis A. In the case where the rotary machine 1 is a compressor, the high-pressure side X1 is a side away from the rotation axis A (the radially outer side based on the rotation axis A), and the low-pressure side X2 is a side closer to the rotation axis A (the radially inner side based on the rotation axis A). In the case where the rotary machine 1 is an expander, the high-pressure side X1 is a side closer to the rotation axis A, and the low-pressure side X2 is a side away from the rotation axis A. In the following, the embodiment is described by referring to the case where the rotary machine 1 is a compressor. The direction where the stationary body 10 and the rotary body 20 face each other is defined as a facing direction Y. The facing direction Y is a direction perpendicular to the flow direction X. The facing direction Y is equal (or approximately equal) to the direction of rotation axis A. As illustrated in FIG. 2, in the facing direction Y, the side of the stationary body 10 relative to the rotary body 20 is defined as one side Y1 of the facing direction, and the side of the rotary body 20 relative to the stationary body 10 is defined as the other side Y2 of the facing direction. In the gap 25, the region between a high-pressure-side tin 51 (described below) and a low-pressure-side fin 52 (described below) (the space in the flow direction X) is defined as a space 25a.

The labyrinth seal 30 prevents the fluid from leaking in the gap 25 from the high-pressure side X1 to the low-pressure side X2. The labyrinth seal 30 prevents circulation of the fluid within the rotary machine 1 (see FIG. 1) by preventing the leakage above. The labyrinth seal 30 is an apparatus capable of reducing the leakage flow rate (hereinafter, also referred to as a "leakage rate") of the fluid without the contact of the stationary body 10 with the rotary body 20 (in a non-contacting manner). As illustrated in FIG. 1, the labyrinth seal 30 includes a plurality of unit structures 30a. The plurality of unit structures 30a are configured to be similar to one another. In the following, the embodiment is described by referring to one unit structure 30a. As illustrated in FIG. 2, the labyrinth seal 30 (each of the plurality of unit structures 30a) includes a step portion 40, a fin 50, and an annular groove 70.

The step portion 40 is formed in the portion of the rotary body 20 on the one side Y1 of the facing direction. The step portion 40 has an annular shape (ring shape) centering on the rotation axis A (see FIG. 1). A cross-section of the rotary machine 1 in a plane parallel to the rotation axis A and including the rotation axis A is referred to as a "rotation axis cross-section". The rotation axis cross-section is a cross-section as viewed from a direction perpendicular to each of the facing direction V and the flow direction X. FIG. 1 and FIG. 2 are views of the rotary machine 1 in the rotation axis cross-section. As illustrated in FIG. 2, in the rotation axis cross-section, the step portion 40 is a straight line extending in the facing direction Y. More specifically, the step portion 40 has an annular cylindrical shape centering on the rotation axis A. In the rotation axis cross-section, the step portion 40 may be a straight line inclined relative to the facing direction Y (not shown). In this case, the step portion 40 has an annular curved surface centering on the rotation axis A (see FIG. 1), and has a curved surface shape defining the outer peripheral part of a truncated cone centering on the rotation axis A. In the rotation axis cross-section, the step portion 40 may have a curved line shape (not illustrated). In this case, the step portion 40 has an annular curved shape centering on the rotation axis A. As to the annular shape centering on the rotation axis A, the same is true for the fin 50 and the annular groove 70 illustrated in FIG. 2.

The step portion 40 faces (is directed to) the high-pressure side X1. A surface of the step portion 40 (step surface) faces the high-pressure side X1. The step portion 40 is configured so that a portion (lower-pressure-side step 47) of the rotary body 20 on the low-pressure side X2 relative to the step portion 40 may be arranged on the one side Y1 of the facing direction relative to a portion (higher-pressure-side step 46) of the rotary body 20 on the high-pressure side X1 relative to the step portion 40. The step portion 40 is connected to the end of the high-pressure-side step 46 on the low-pressure side X2. The step portion 40 is connected to the end of the low-pressure-side step 47 on the high-pressure side X1.

The high-pressure-side step 46 (high-pressure side plane) is formed in the portion of the rotary body 20 on the one side Y1 of the facing direction. In the rotation axis cross-section, the high-pressure-side step 46 is a straight line extending in the flow direction X. More specifically, the high-pressure-side step 46 has an annular planar shape centering on the rotation axis A (see FIG. 1). In the rotation axis cross-section, the high-pressure-side step 46 may be entirely or partially a straight line or a curve that is inclined relative to the flow direction X. In this case, the high-pressure-side step 46 has an annular curved shape (for example, a substantially planar shape) centering on the rotation axis A.

The low-pressure-side step 47 (low-pressure side plane) is arranged on the low-pressure side X2 relative to the high-pressure-side step 46 and arranged on the one side Y1 of the facing direction relative to the high-pressure-side step 46. The shape of the low-pressure-side step 47 is the same as the shape of the high-pressure-side step 46. For example, the low-pressure-side step 47 has an annular planar shape centering on the rotation axis A (see FIG. 1).

The fin 50 is a portion partitioning the gap 25. The fin 50 is arranged not to completely partition the gap 25 but to narrow the gap 25. The fin 50 extends from the portion of the stationary body 10 on the other side Y2 of the facing direction toward the other side Y2 of the facing direction and extends near to the surface of the rotary body 20 on the one side Y1 of the facing direction. The fin 50 is provided integrally with the stationary body 10. The fin 50 may be a separate body from the stationary body 10. The fin 50 includes, in the order from the high-pressure side X1 to the low-pressure side X2, a high-pressure-side fin 51 and a low-pressure-side fin 52.

The high-pressure-side fin 51 is provided on the high-pressure side X1 relative to the step portion 40. The high-pressure-side fin 51 is arranged at a position to face the high-pressure-side step 46 in the facing direction Y. The position of the distal end of the high-pressure-side fin 51 (end on the other side Y2 of the facing direction) in the facing direction Y is closer to the other side Y2 of the facing direction than the position of the surface of the low-pressure-side step 47 (surface on the one side Y1 of the facing direction in the facing direction Y. A gap δ1 in the facing direction Y is present between the distal end of the high-pressure-side fin 51 and the rotary body 20. Thus, the high-pressure-side fin 51 and the low-pressure-side step 47 are arranged so that the position of the distal end of each high-pressure-side fin 51 in the facing direction and the position of the low-pressure-side step 47 in the facing direction are different from each other. Therefore, the fluid is prevented from flowing (passing through) in the flow direction X without coming into contact with the fin 50 and the step portion 40.

The low-pressure-side fin 52 is provided on the low-pressure side X2 relative to the step portion 40. The low-pressure-side fin 52 is arranged at a position facing the low-pressure-side step 47 in the facing direction Y and may be arranged at a position facing the annular groove 70 in the facing direction Y. A gap δ2 in the facing direction Y is present between the distal end of the low-pressure-side fin 52 and the rotary body 20. The gap δ2 is an outflow port of the fluid from the gap 25. The low-pressure-side fin 52 includes a high-pressure-side surface 52*a* that is a side surface thereof on the high-pressure side X1 and a low-pressure-side side surface 52*b* that is a side surface thereof on the low-pressure side X2. The high-pressure-side side surface 52*a* and the low-pressure-side side surface 52*b* are surfaces perpendicular to the flow direction X. The "perpendicular" encompasses "substantially perpendicular" (hereinafter the same).

The annular groove 70 is a groove for allowing a vortex V2 to flow in. The annular groove 70 is formed on a part (place) where the vortex V2 is generated and is configured to allow the vortex V2 to flow into the space surrounded by the annular groove 70 (the inside of the annular groove 70). The annular groove 70 is formed in the portion of the rotary body 20 on the one side Y1 of the facing direction. The annular groove 70 is arranged in at least a part of a region on the low-pressure side X2 relative to the step portion 40 as well as on the high-pressure side X1 relative to the low-pressure-side fin 52. The annular groove 70 is formed in the low-pressure-side step 47 and is dented toward the other side Y2 of the facing direction relative to the end of the low-pressure-side step 47 on the one side Y1 of the facing direction. A part of the annular groove 70 may be arranged on the low-pressure side X2 relative to the high-pressure-side side surface 52*a*.

The flow-direction X position (position in the flow direction X) of the portion which is the end of the annular groove 70 on the one side Y1 of the facing direction and the end of the annular groove 70 on the high-pressure side X1 is on the low-pressure side X2 relative to the portion which is the end of the step portion 40 on the one side Y1 of the facing direction and the end of the step portion 40 on the low-pressure side X2.

The flow-direction X position of the portion which is the end of the annular groove 70 on the one side Y1 of the facing direction and the end of the annular groove 70 on the low-pressure-side X2 is any one of the following [position a1] to [position a5]. [Position a1]: On the high-pressure side X1 relative to the distal end (end on the other side Y2 of the facing direction) of the high-pressure-side side surface 52*a*. [Position a2]: The same (or substantially the same) flow-direction X position as the distal end of the high-pressure-side side surface 52*a*. [Position a3]: On the low-pressure side X2 relative to the distal end of the high-pressure-side side surface 52*a* as well as on the high-pressure side X1 relative to the distal end of the low-pressure-side side surface 52*b*. [Position a4]: The same (or substantially the same) flow-direction X position as the distal end of the low-pressure-side side surface 52*b*. [Position a5]: On the low-pressure side X2 relative to the low-pressure-side side surface 52*b*.

The annular groove 70 has an annular shape centering on the rotation axis A (see FIG. 1). In the rotation axis cross-section, the shape of the portion surrounded by the annular groove 70 (the inside of the annular groove 70) is rectangular. In FIG. 2, the end of the "portion surrounded by the annular groove 70" on the one side Y1 of the facing direction is denoted by a two-dot chain line. The annular groove 70 includes a high-pressure-side side surface 70*a* which is a side surface thereof on the high-pressure side X1, a low-pressure-side side surface 70*b* which is a side surface thereof on the low-pressure side X2, and a bottom surface 70*c*. The high-pressure-side side surface 70*a* and the low-pressure-side side surface 70*b* are surfaces perpendicular to the flow direction X. The bottom surface 70*c* is a surface of the portion of the annular groove 70 on the other side Y2 of the facing direction and is a surface constituting the bottom of the annular groove 70 (the bottom based on the surface of the low-pressure-side step 47). The bottom surface 70*c* is a surface perpendicular to the facing direction Y.

As illustrated in FIG. 1, the labyrinth seal 130 is configured to be approximately similar to the labyrinth seal 30. The number of the unit structures 30*a* of the labyrinth seal 30 is 5 and the number of the unit structures 30*a* of the labyrinth seal 130 is 4.

(First Member and Second Member)

The "first member" is a member on which the fin 50 is provided. The first member is the stationary body 10 in the labyrinth seal 30 and may be the rotary body 20. The "second member" is a member on which the step portion 40 and the annular groove 70 are provided. The second member is the rotary body 20 in the labyrinth seal 30 and may be the stationary body 10.

(Flow of Fluid)

A fluid flowing through the gap 25 illustrated in FIG. 2 flows as follows. The fluid passes through the gap δ1 from the high-pressure side X1 relative to the high-pressure-side fin 51, and enters the space 25*a* and forms the vortex V1. The vortex V1 is formed as follows. The fluid flows straight (including substantially straight) to the low-pressure side X2 substantially along the surface of the high-pressure-side step 46 (surface on the one side Y1 of the facing direction), comes into contact with (collides with) the step portion 40, and flows to (turns to) the one side Y1 of the facing direction. This flow comes into contact with the surface of the stationary body 10 on the other side Y2 of the facing direction, and flows to the high-pressure side X1 substantially along the surface of the stationary body 10 on the other side Y2 of the facing direction. Then, this flow comes into contact with the high-pressure-side fin 51, flows to the other side Y2 of the facing direction substantially along the high-pressure-side fin 51, comes into contact with the high-pressure-side step 46, and then flows to the low-pressure side X2. In this way, the vortex V1 is formed.

The fluid coming into contact with the step portion 40 and flowing to the one side Y1 of the facing direction branches into the vortex V1 and a vortex V2 on the low-pressure side X2 relative to the vortex V1. The vortex V2 is formed as follows. The fluid branched from the vortex V1 comes into contact with the surface of the stationary body 10 on the other side Y2 of the facing direction, and flows to the low-pressure side X2 substantially along the surface of the stationary body 10 on the other side Y2 of the facing direction. This flow comes into contact with the high-pressure-side side surface 52*a* of the low-pressure-side fin 52 and flows to the other side Y2 of the facing direction substantially along the high-pressure-side side surface 52*a*. This flow enters the annular groove 70 and flows substantially along the internal surface of the annular groove 70. This flow flows to the other side Y2 of the facing direction substantially along the low-pressure-side side surface 70*b*, flows to the high-pressure side X1 substantially along the bottom surface 70*c*, flows to the one side Y1 of the facing direction substantially along the high-pressure-side side surface 70*a*, and flows out of the annular groove 70. In this way, the vortex V2 is formed.

The fluid flowing to the other side Y2 of the facing direction substantially along the high-pressure-side side surface 52*a* brandies into the vortex V2 and a branch flow F flowing toward the gap δ2. The branch flow F passes through the gap δ2, flows to the low-pressure side X2, and flows out of the space 25a (leaks).

When the fluid flowing to the other side Y2 of the facing direction substantially along the high-pressure-side side surface 52a enters the annular groove 70, the flow rate of the branch flow F is decreased, and the leakage rate of the fluid from the space 25a is reduced. In addition, fluid friction is generated by the vortex V1 and the vortex V2 formed in the space 25a, to cause fluid energy loss, thereby reducing the leakage rate of the fluid from the space 25a. The fluid friction encompasses friction between fluids and friction between the fluid and the wall surface. The wall surface can be regarded as a fluid at a flow velocity of zero. As the wall surface, for example, the surface of the annular groove 70 is exemplified.

(Dimension)

As long as the annular groove 70 is present in at least a part of the region on the low-pressure side X2 relative to the step portion 40 as well as on the high-pressure side X1 relative to the low-pressure-side fin 52, the effect (reduction in the leakage rate) based on the annular groove 70 is obtained. Furthermore, the effect based on the annular groove 70 can be more enhanced by satisfying the following conditions.

The dimension regarding the flow direction X in the rotation axis cross-section includes a distance L, a distance G, an opening width W, a distance E, and a thickness T. These dimensions are defined as follows.

The distance L is a distance (the minimum distance, the distance therebetween) in the flow direction X from the step portion 40 to the portion which is the end of the annular groove 70 on the one side Y1 of the facing direction as well as the end of the annular groove 70 on the low-pressure side X2. In the case where the step portion 40 has a width in the flow direction X (for example, the case where the step portion 40 is inclined with respect to the facing direction Y), the starting point of the distance L on the high-pressure side X1 is the portion which is the end of the step portion 40 on the one side Y1 of the facing direction as well as the end of the step portion 40 on the low-pressure-side X2 (the same is true for the distance G and the distance E). In the present embodiment, the distance L is a distance in the flow direction X between the step portion 40 and the low-pressure-side side surface 70b.

The distance G is a distance (minimum distance) in the flow direction X from the step portion 40 to the portion which is the distal end of the low-pressure-side fin 52 as well as the end of the low-pressure-side fin 52 on the high-pressure side X1. In the present embodiment, the distance G is a distance in the flow direction X from the step portion 40 to the high-pressure-side side surface 52a.

The opening width W is a width of the opening of the annular groove 70 in the flow direction X. More specifically, the opening width W is the width of the annular groove 70 in the flow direction X in the end of the annular groove 70 on the one side Y1 of the facing direction. The distance E is a distance in the flow direction X from the step portion 40 to the portion which is the end of the annular groove 70 on the one side Y1 of the facing direction as well as the end of the annular groove 70 on the high-pressure-side XL The distance E is a distance obtained by subtracting the opening width W from the distance L.

The thickness T is a width of the distal end of the low-pressure-side fin 52 in the flow direction X. Here, "the distal end of the low-pressure-side fin 52" is a portion with which the branch flow F directly comes into contact. In the example illustrated in FIG. 5, since the branch flow F does not directly come into contact with the low-pressure-side side surface 52b, the low-pressure-side side surface 52b is not included in the meaning of the "distal end of the low-pressure-side fin 52".

As illustrated in FIG. 2, in the rotation axis cross-section, the dimensions related to the facing direction Y include the height H and the depth D. These dimensions are defined as follows.

The height H is a width of the step portion 40 in the facing direction Y. More specifically, the height H is a distance in the facing direction Y from the end of the surface of the high-pressure-side step 46 on the low-pressure-side X2 (surface on the one side Y1 of the facing direction) to the end of the surface of the low-pressure-side step 47 on the high-pressure side X1 (surface on the one side Y1 of the facing direction).

The depth D is a width of the annular groove 70 in the facing direction Y. More specifically, the depth D is a distance in the facing direction Y from the end of the annular groove 70 on the other side Y2 of the facing direction (for example, the bottom surface 70c) to the surface of the low-pressure-side step 47 (surface on the one side Y1 of the facing direction).

(Preferable Condition Regarding Opening width W and Distance E)

By increasing the opening width W, the vortex V2 easily enters the annular groove 70, and the vortex V2 can be formed to be large. As a result, the energy loss can be further increased. For example, it is preferable to satisfy the relationship "W/G>0.2".

In addition, by reducing the distance E, the vortex V2 can be formed to be large. As a result, the energy loss can be further increased. For example, it is preferable to satisfy the relationship "E/G<0.8".

(Preferable Condition Regarding Distance G and Distance L)

The position of the low-pressure-side side surface 70b in the flow direction X relative to the position of the high-pressure-side side surface 52a in the flow direction X may be preferably the same (on the same surface) or on the low-pressure side X2 (preferably G≤L). By setting to satisfy the relationship "G≤L", the vortex V2 flowing to the other side Y2 of the facing direction along the low-pressure-side fin 52 easily enters the annular groove 70, so that the flow rate of the branch flow F can be reduced. Since the fluid easily enters the annular groove 70, the flow velocity of the vortex V2 can be increased, and as a result, the energy loss can be further increased.

Figure 3:
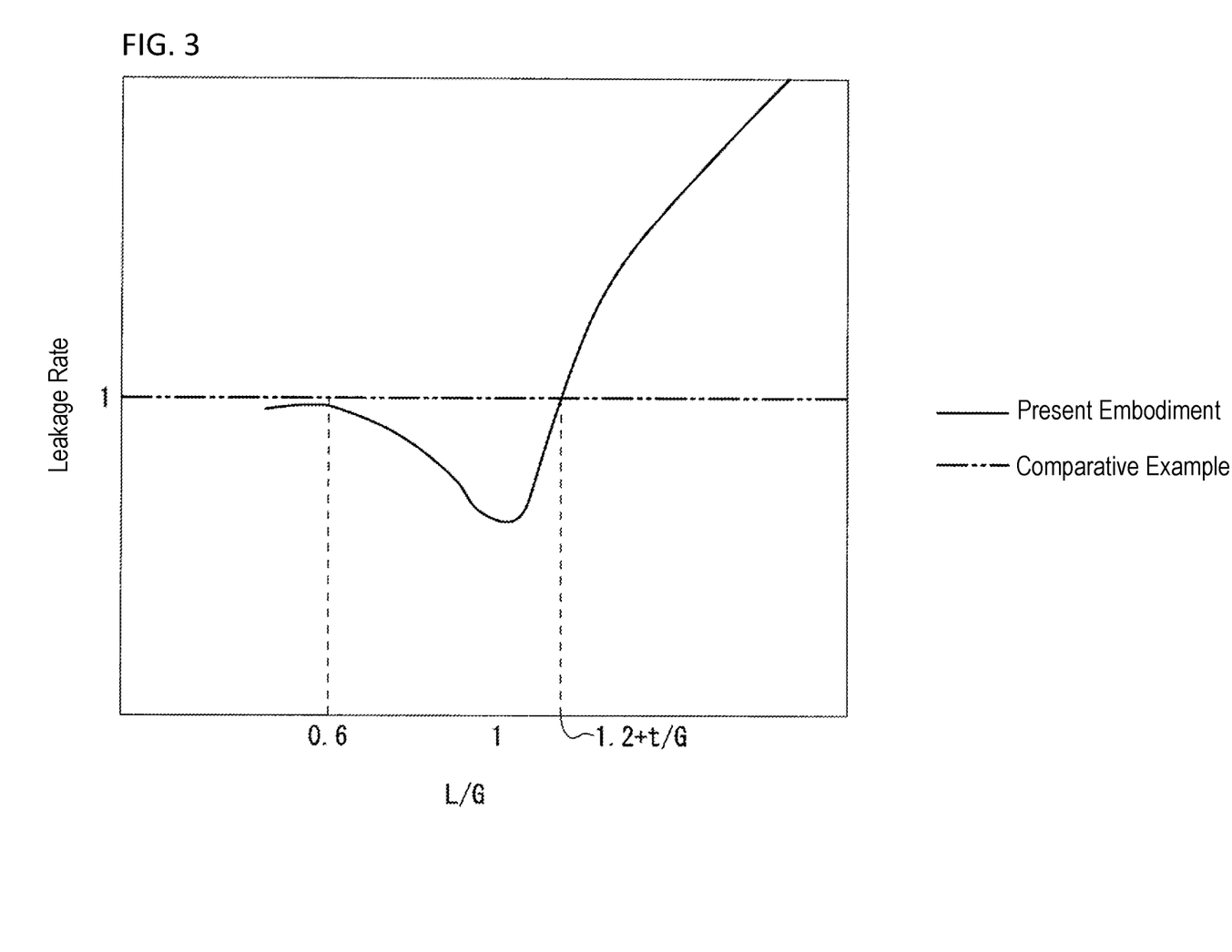
FIG. 3 is a graph illustrating the relationship between L/G (see FIG. 2) and a leakage rate.

The position of the high-pressure-side side surface 52a, the position of the low-pressure-side side surface 70b, and the leakage rate were examined through computational fluid dynamics (CFD) analysis. As a result, it was found that the leakage rate is changed depending on L/G as illustrated in FIG. 3. "Comparative Example" in FIG. 3 is the case of a labyrinth seal not including the annular groove 70 illustrated in FIG. 2. In the graph shown in FIG. 3, the leakage rate on the vertical axis is in dimensionless unit, and specifically the leakage rate of the case of Comparative Example is set as 1 (the same is true for FIG. 4).

When the low-pressure-side side surface 70b is away too much toward the high-pressure side X1 relative to the high-pressure-side side surface 52a illustrated in FIG. 2, the fluid flowing to the other side Y2 of the facing direction along the low-pressure-side fin 52 hardly enters the annular groove 70. As a result, the effect of reducing the leakage rate decreases. In addition, when the low-pressure-side side surface 70b is away too much toward the low-pressure side X2 relative to the high-pressure-side side surface 52a, the gap δ2 between the low-pressure-side fin 52 and the rotary body 20 becomes greater, and thus, the fluid easily passes through the gap δ2 and the effect of reducing the leakage rate decreases.

For this reason, as illustrated in FIG. 3, it is preferable to satisfy the relationship "0<L/G<1.2+T/G". In this case, the leakage rate can be definitely reduced as compared with the case of Comparative Example. Further, it is more preferable to satisfy the relationship "0.6<L/G<1.2+T/G". In this case, the leakage rate can be further reduced.

(Preferable Condition Regarding Height H and Depth D)

Figure 4:
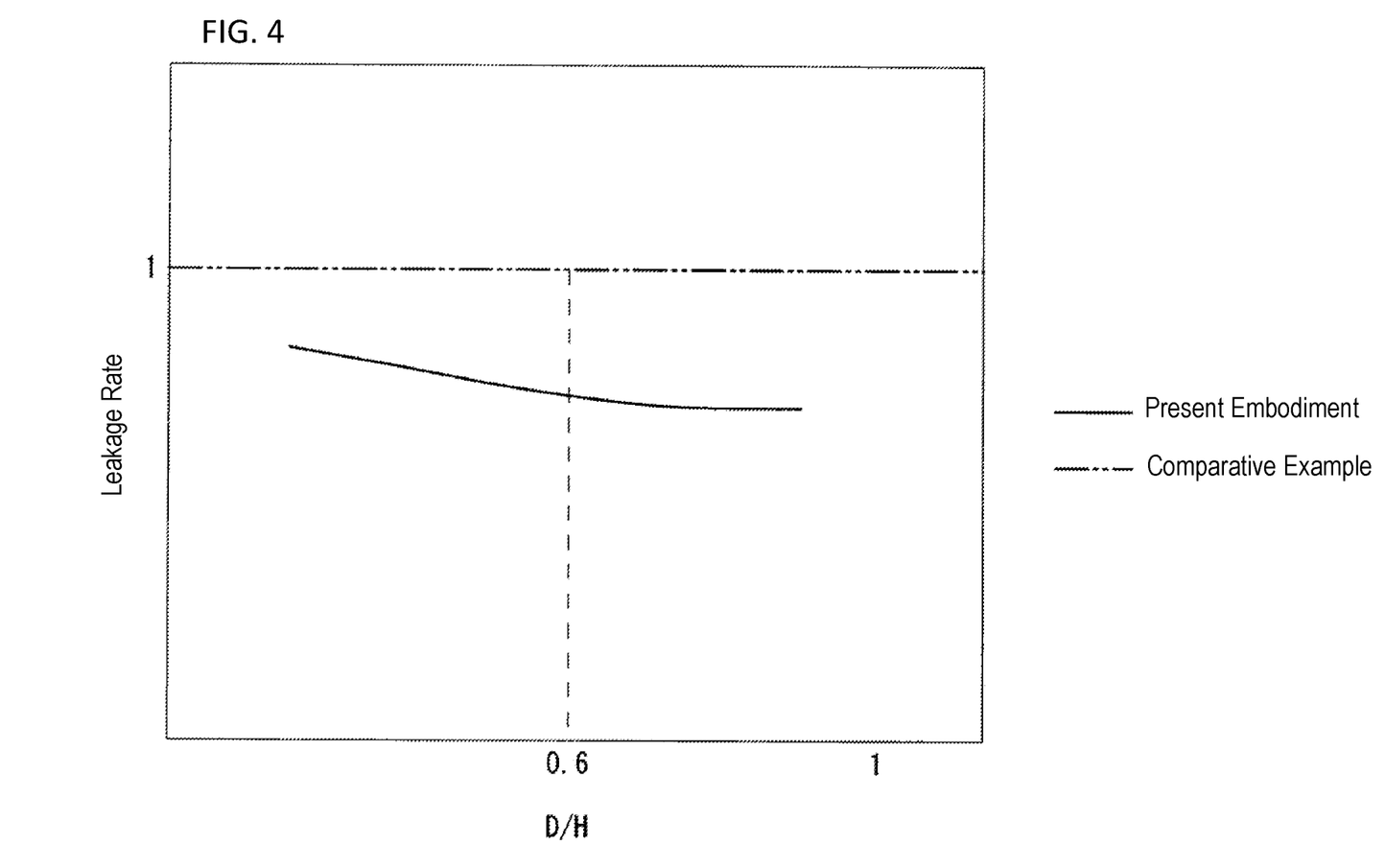
FIG. 4 is a graph illustrating the relationship between (see FIG. 2) and a leakage rate.

The height H, the depth D, and the leakage rate shown in FIG. 2 were examined through CFD analysis. As a result, it was found that the leakage rate is changed depending on D/H as illustrated in FIG. 4. When the depth D illustrated in FIG. 2 is small, the flow of the vortex V2 capable of entering the annular groove 70 becomes small, and the flow rate of the branch flow F increases, and thus, the leakage rate is increased. Therefore, as illustrated in FIG. 4, it is preferable to satisfy the relationship "0.6<D/H". In this case, the leakage rate can be definitely reduced as compared with the case of Comparative Example. Further, when the relationship "0<D/H" is satisfied, the effect of reducing the leakage rate is further obtained as compared with Comparative Example.

(First Effect of the Invention)

The effect based on the labyrinth seal 30 illustrated in FIG. 2 is as follows. The labyrinth seal 30 is provided in the rotary machine 1. The rotary machine 1 includes the stationary body 10, the rotary body 20, and the gap 25. The rotary body 20 faces the stationary body 10. The gap 25 is formed between the stationary body 10 and the rotary body 20. The gap 25 is configured so that the fluid flows from the high-pressure side X1 to the low-pressure side X2 in the flow direction X. The flow direction X is a direction perpendicular to the facing direction Y. The facing direction Y is a direction where the stationary body 10 and the rotary body 20 face each other. In the facing direction Y, the side of the stationary body 10 relative to the rotary body 20 is defined as one side Y1 of the facing direction. In the facing direction Y, the side of the rotary body 20 relative to the stationary body 10 is defined as the other side Y2 of the facing direction. The labyrinth seal 30 includes the step portion 40, the high-pressure-side fin 51, the low-pressure-side fin 52, and the annular groove 70.

[Configuration 1-1]

The step portion 40 is formed in a portion of the rotary body 20 on the one side Y1 of the facing direction, and faces the high-pressure side X1. The high-pressure-side fin 51 is arranged on the high-pressure side X1 relative to the step portion 40 and extends from a portion of the stationary body 10 on the one side Y1 other side Y2 of the facing direction to the other side Y2 of the facing direction. The low-pressure-side fin 52 is arranged on the low-pressure side X2 relative to the step portion 40 and extends from the portion of the stationary body 10 on the one side Y1 of the facing direction to the other side Y2 of the facing direction.

[Configuration 1-2]

The annular groove 70 is formed in a portion of the rotary body 20 on the one side Y1 of the facing direction, and is arranged in at least a part of the region on the low-pressure side X2 relative to the step portion 40 as well as on the high-pressure side X1 relative to the low-pressure-side fin 52.

The labyrinth seal 30 mainly includes [Configuration 1-1] above. Therefore, the vortex V2 is formed on the low-pressure side X2 relative to the step portion 40 as well as on the high-pressure side X1 relative to the low-pressure-side fin 52. In this connection, the labyrinth seal 30 also includes [Configuration 1-2] above. Accordingly, the vortex V2 flows into the annular groove 70. Therefore, as compared with the case where the annular groove 70 is not provided, the vortex V2 can be expanded, the flow rate of the vortex V2 can be increased, and the flow velocity of the vortex V2 can be raised. The fluid friction between the vortex V2 and its periphery can be increased, making it possible to increase the fluid energy loss. As a result, the leakage of the fluid in the gap 25 can be prevented.

In the labyrinth seal 30 including [Configuration 1-1] above, the branch flow F is formed by branching off from the vortex V2 towards the gap δ2 between the low-pressure-side fin 52 and the rotary body 20. Here, in the case of not providing the annular groove 70, the fluid flowing to the other side Y2 of the facing direction along the low-pressure-side fin 52 comes into contact with the low-pressure-side step 47 (blown off), and thus is likely to flow into the gap δ2 (likely to become the branch flow F). To cope with this, the labyrinth seal 30 includes the annular groove 70 of [Configuration 1-2] above. Therefore, the vortex V2 is likely to enter the annular groove 70. Accordingly, the amount of the branch flow F formed by branching off from the vortex V2 can be reduced, and thus leakage of the fluid in the gap 25 can be prevented.

(Second Effect of the Invention)

L, G, and T are defined as follows. L is a distance in the flow direction X from the step portion 40 to the portion which is the end of the annular groove 70 on the one side Y1 of the facing direction as well as the end of the annular groove 70 on the low-pressure-side X2. G is a distance in the flow direction X from the step portion 40 to the portion which is the distal end of the low-pressure-side fin 52 as well as the end of the low-pressure-side fin 52 on the high-pressure-side X1. T is a width of the distal end of the low-pressure-side fin 52 in the flow direction X.

[Configuration 4]

In this case, the relationship "0<L/G<1.2+T/G" is satisfied.

According to [Configuration 4] above, as compared with the case where the relationship "1.2+T/G≤L/G" is satisfied, the gap δ2 between the low-pressure-side fin 52 and the rotary body 20 can be reduced. Therefore, leakage of the fluid from the gap δ2 can be further prevented, and thus leakage of the fluid in the gap 25 can be further prevented (see FIG. 3).

(Fifth Effect of the Invention)

[Configuration 5]

The relationship "0.6<L/G<1.2+T/G" is satisfied.

According to [Configuration 5] above, the flow rate of the vortex V2 flowing into the annular groove 70 can be increased as compared with the case where the relationship "L/G≤0.6" is satisfied. Accordingly, the fluid energy loss in the vortex V2 can be further increased, and thus leakage of the fluid in the gap 25 can be further prevented (see FIG. 3).

(Sixth Effect of the Invention)

The width of the step portion 40 in the facing direction Y is defined by H. The width of the annular groove 70 in the facing direction Y is defined by D.

[Configuration 6]

In this case, the relationship "0.6<D/H" is satisfied.

According to [Configuration 6] above, the flow rate of the vortex V2 flowing into the annular groove 70 can be increased as compared with the case where the relationship "D/H≤0.6" is satisfied. Accordingly, the fluid energy loss in the vortex V2 can be further increased, and thus leakage of the fluid in the gap 25 can be further prevented.

Second Embodiment

Figure 5:
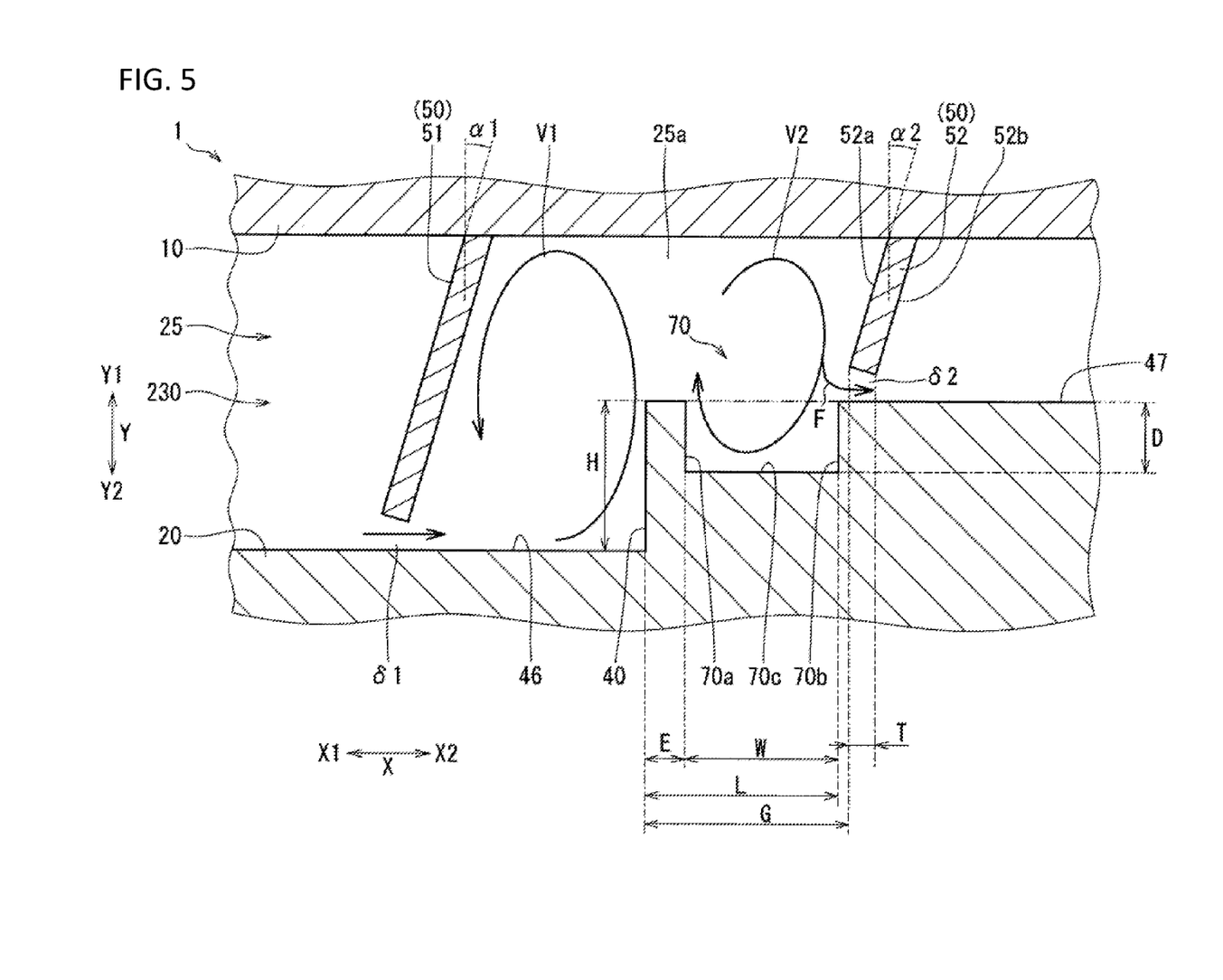
FIG. 5 shows a second embodiment and corresponds to FIG. 2.

With respect to a labyrinth seal 230 of the second embodiment, the difference from the first embodiment is described by referring to FIG. 5. As to the labyrinth seal 230 of the second embodiment, the same reference numerals as in the first embodiment are used for the parts in common with the first embodiment, and description of the parts is omitted (the same is true for the description of other embodiments in terms of omitting the description of parts in common). The difference is the inclination of the fin 50 relative to the facing direction Y.

The distal end of the low-pressure-side fin 52 is arranged on the high-pressure side X1 relative to the proximal end (end on the one side Y1 of the facing direction) of the low-pressure-side fin 52. In the rotation axis cross-section, the low-pressure-side fin 52 is a straight line, the high-pressure-side side surface 52a is a straight line, and the low-pressure-side side surface 52b is a straight line. In the rotation axis cross-section, the high-pressure-side side surface 52a is inclined at an angle α2 relative to the facing direction Y. Also, in the rotation axis cross-section, the low-pressure-side fin 52 may have a curved shape or a bent shape such as L shape (the same is true for the high-pressure-side fin 51).

The high-pressure-side fin 51 is configured to be similar to the low-pressure-side fin 52. In the rotation axis cross-section, the side surface of the high-pressure-side fin 51 on the high-pressure side X1 is inclined at an angle α1 relative to the facing direction Y. The angle α1 may be the same as or different from the angle α2. Furthermore, either the angle α1 or the angle α2 may be 0°.

(Seventh Effect of the invention)

The effect based on the labyrinth seal 230 illustrated in FIG. 5 is as follows.

[Configuration 7]

The distal end of the low-pressure-side tin 52 is arranged on the high-pressure side X1 relative to the proximal end of the low-pressure-side fin 52.

According to [Configuration 7] above, the vortex V2 is likely to flow towards the high-pressure side X1 while flowing to the other side Y2 of the facing direction along the low-pressure-side fin 52. Accordingly, the amount of the branch flow F towards the low-pressure side X2 can be reduced, and the flow rate of the vortex V2 flowing into the annular groove 70 can be increased. Therefore, leakage of the fluid in the gap 25 can be further prevented.

Third Embodiment

Figure 6:
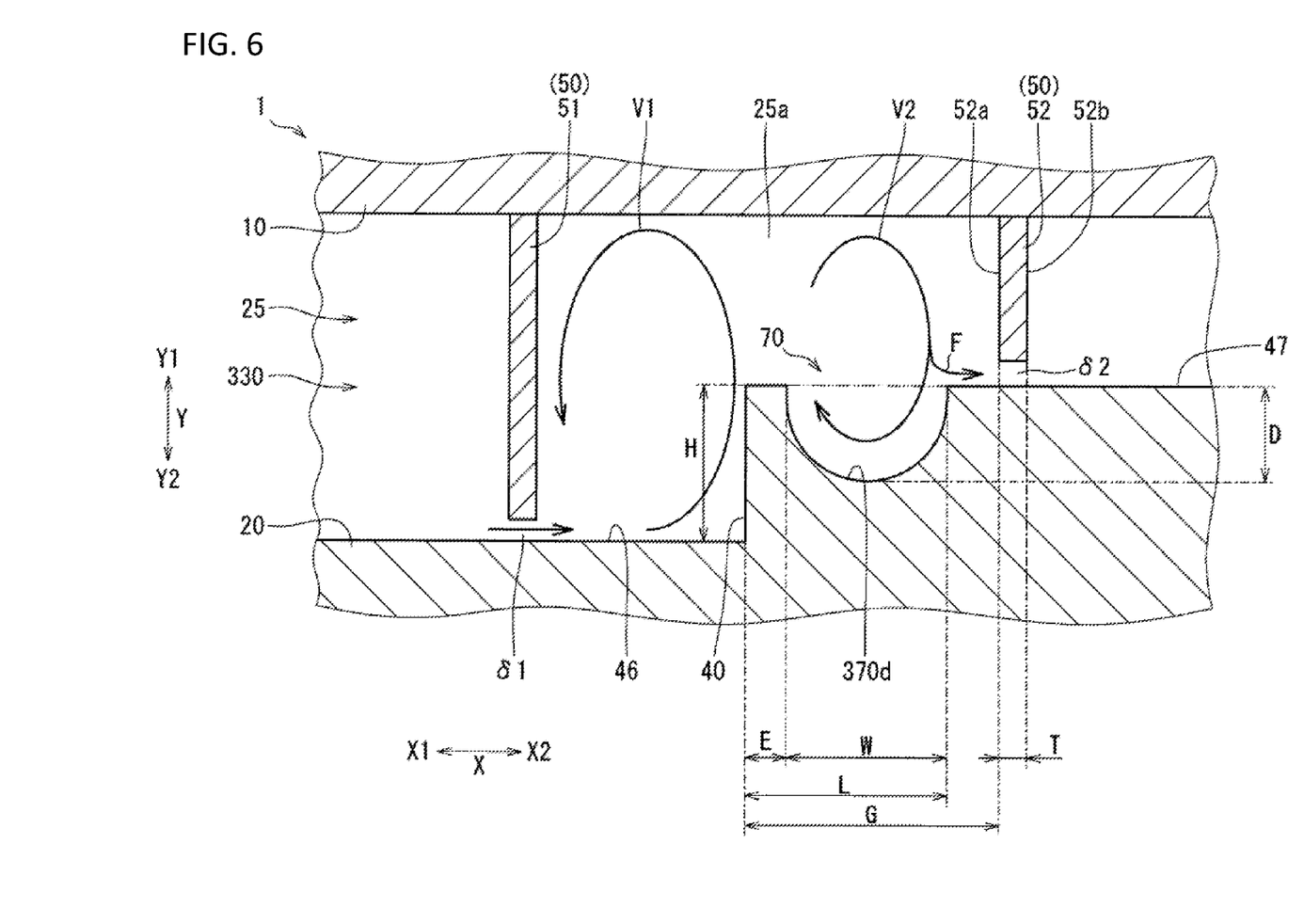
FIG. 6 shows a third embodiment and corresponds to FIG. 2.

With respect to a labyrinth seal 330 of the third embodiment, the difference from the first embodiment is described by referring to FIG. 6. The difference is that the annular groove 70 has an arc-shaped portion 370d.

The arc-shaped portion 370d is provided at the bottom of the annular groove 70. The cross-section (contour) of the arc-shaped portion 370d in the rotation axis cross-section is an arc protruding toward the other side Y2 of the facing direction, and has a circular arc shape or a semi-circular arc shape (a central angle of the circular arc is 180°). The central angle of the circular arc may be less than 180°. The "circular arc shape" encompasses the case of a substantially circular arc shape (for example, substantially semi-circular arc shape). The cross-section of the arc-shaped portion 370d in the rotation axis cross-section may be an elliptic arc shape (a curved line constituting a part of an ellipse) or a semi-elliptic arc shape. The "elliptic arc shape" encompasses the case of a substantially elliptic arc shape (for example, substantially semi-elliptic arc shape). The high-pressure-side side surface 70a and the low-pressure-side side surface 70b illustrated in FIG. 2 are provided so as to be continuous with the arc-shaped portion 370d illustrated in FIG. 6, in the case of providing the arc-shaped portion 370d, the high-pressure-side side surface 70a and the low-pressure-side side surface 70b may not be provided.

(Second Effect of the Invention)

The effect based on the labyrinth seal 330 illustrated in FIG. 6 is as follows.

[Configuration 2]

The cross-section of the bottom (arc-shaped portion 370d) of the annular groove 70 as viewed from a direction perpendicular to each of the facing direction Y and the flow direction X has an arc shape protruding toward the other side Y2 of the facing direction.

According to [Configuration 2] above, as compared with the case where the inside of the annular groove 70 has a rectangular shape in the rotation axis cross-section (see FIG. 2), etc., the shape of the annular groove 70 becomes a shape close to the shape of the vortex V2 flow. Accordingly, the vortex V2 flows along the bottom of the annular groove 70, and thus the vortex V2 can be prevented from reduction in the flow velocity in the annular groove 70. Consequently, the energy loss in the vortex V2 can be further increased, and leakage of the fluid in the gap 25 can be further prevented.

Fourth Embodiment

Figure 7:
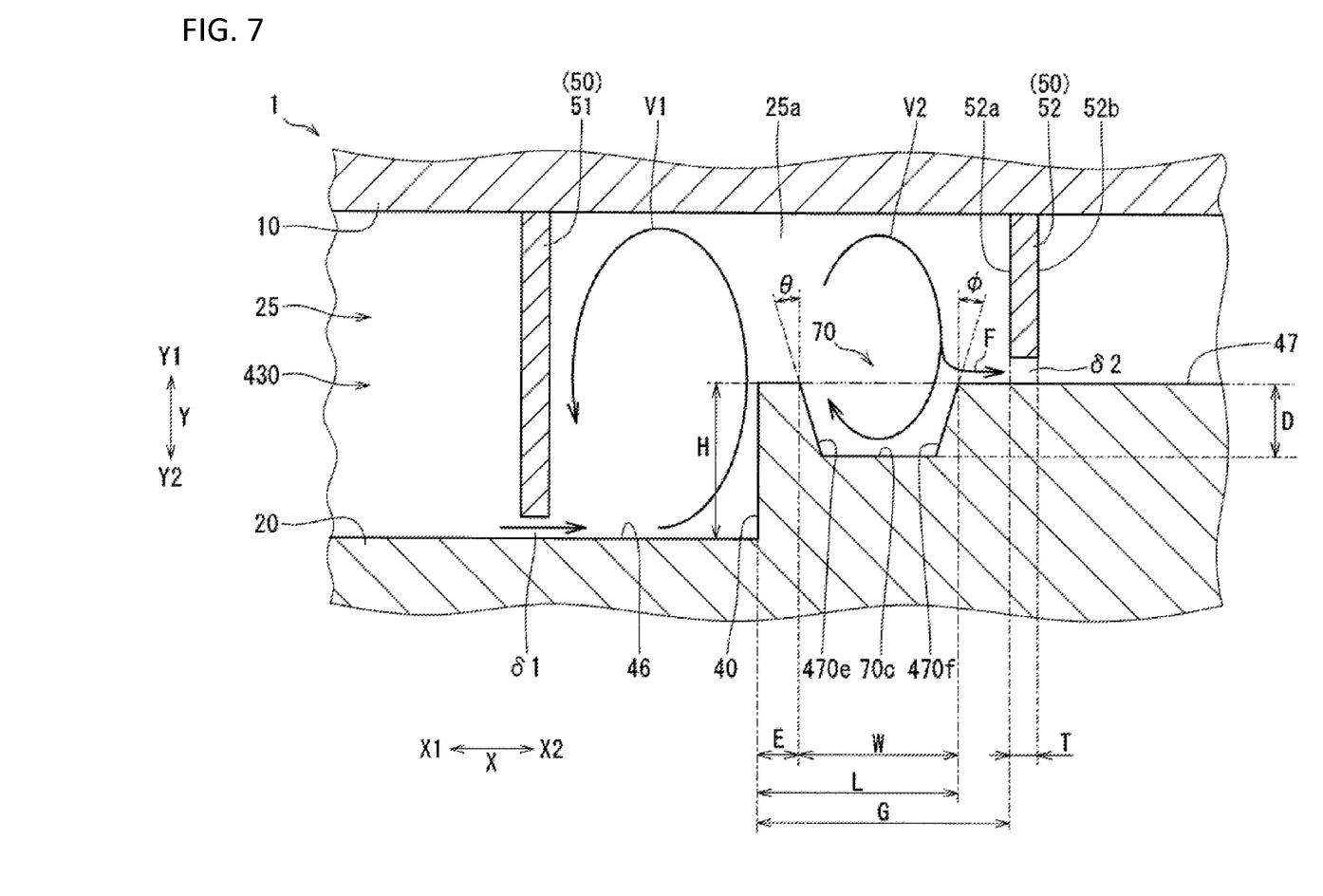
FIG. 7 shows a fourth embodiment and corresponds to FIG. 2.

With respect to the labyrinth seal 330 of the fourth embodiment, the difference from that of the first embodiment is described by referring to FIG. 7. The difference is the shape of the annular groove 70. The annular groove 70 includes a high-pressure-side slant portion 470e (slant portion) and a low-pressure-side slant portion 470f (slant portion).

The high-pressure-side slant portion 470e is provided in the high-pressure-side X1 portion of the annular groove 70. The end of the high-pressure-side slant portion 470e on the other side Y2 of the facing direction is arranged on the low-pressure side X2 (the center side of the annular groove 70 in the flow direction X) relative to the end of the high-pressure-side slant portion 470e on the one side Y1 of the facing direction. In the rotation axis cross-section, the high-pressure-side slant portion 470e is a straight line and is inclined at an angle θ relative to the facing direction Y.

The low-pressure-side slant portion 470f is provided in the low-pressure-side X2 portion of the annular groove 70. The end of the low-pressure-side slant portion 470f on the other side Y2 of the facing direction is arranged on the high-pressure side X1 (the center side of the annular groove 70 in the flow direction X) relative to the end of the low-pressure-side slant portion 470f on the one side Y1 of the facing direction. In the rotation axis cross-section, the low-pressure-side slant portion 470f is a straight line and is inclined an angle φ relative to the facing direction Y. Both the high-pressure-side slant portion 470e and the low-pressure-side slant portion 470f may be provided, or only one of the slant portions may be provided. In addition, the angle θ may be the same as or different from the angle φ.

(Third Effect of the Invention)

The effect based on a labyrinth seal 430 illustrated in FIG. 7 is as follows. The annular groove 70 includes a slant portion (at least one of the high-pressure-side slant portion 470e and the low-pressure-side slant portion 470f) provided on at least one of the portion of the annular groove 70 on the high-pressure side X1 and the portion of the annular groove 70 on the low-pressure side X2. The labyrinth seal 430 includes at least one of [Configuration 3-1] and [Configuration 3-2] below.

[Configuration 3-1]

The end of the high-pressure-side slant portion 470e on the other side Y2 of the facing direction is arranged on the center side (the low-pressure side X2) of the annular groove 70 in the flow direction X relative to the end of the high-pressure-side slant portion 470e on the one side Y1 of the facing direction.

[Configuration 3-2]

The end of the low-pressure-side slant portion 470f on the other side Y2 of the facing direction is arranged on the center side (the high-pressure side X1) of the annular groove 70 in the flow direction X relative to the end of the low-pressure-side slant portion 470f on the one side Y1 of the facing direction.

In the case where the labyrinth seal 430 includes [Configuration 3-1] above, as compared with the case where the inside of the annular groove 70 has the rectangular shape in the rotation axis cross-section (see FIG. 2), etc., the shape of the annular groove 70 becomes a shape close to the flow shape of the vortex V2. Accordingly, the vortex V2 flows along the high-pressure-side slant portion 470e, and thus, the vortex V2 can be prevented from reduction in the flow velocity in the annular groove 70. Therefore, the energy loss in the vortex V2 can be further increased, and leakage of the fluid in the gap 25 can be further prevented. Similarly, in the case where the labyrinth seal 430 includes [Configuration 3-2] above, the vortex V2 flows along the low-pressure-side slant portion 470f, and thus the energy loss in the vortex V2 can be further increased. Therefore, leakage of the fluid in the gap 25 can be further prevented.

Fifth Embodiment

Figure 8:
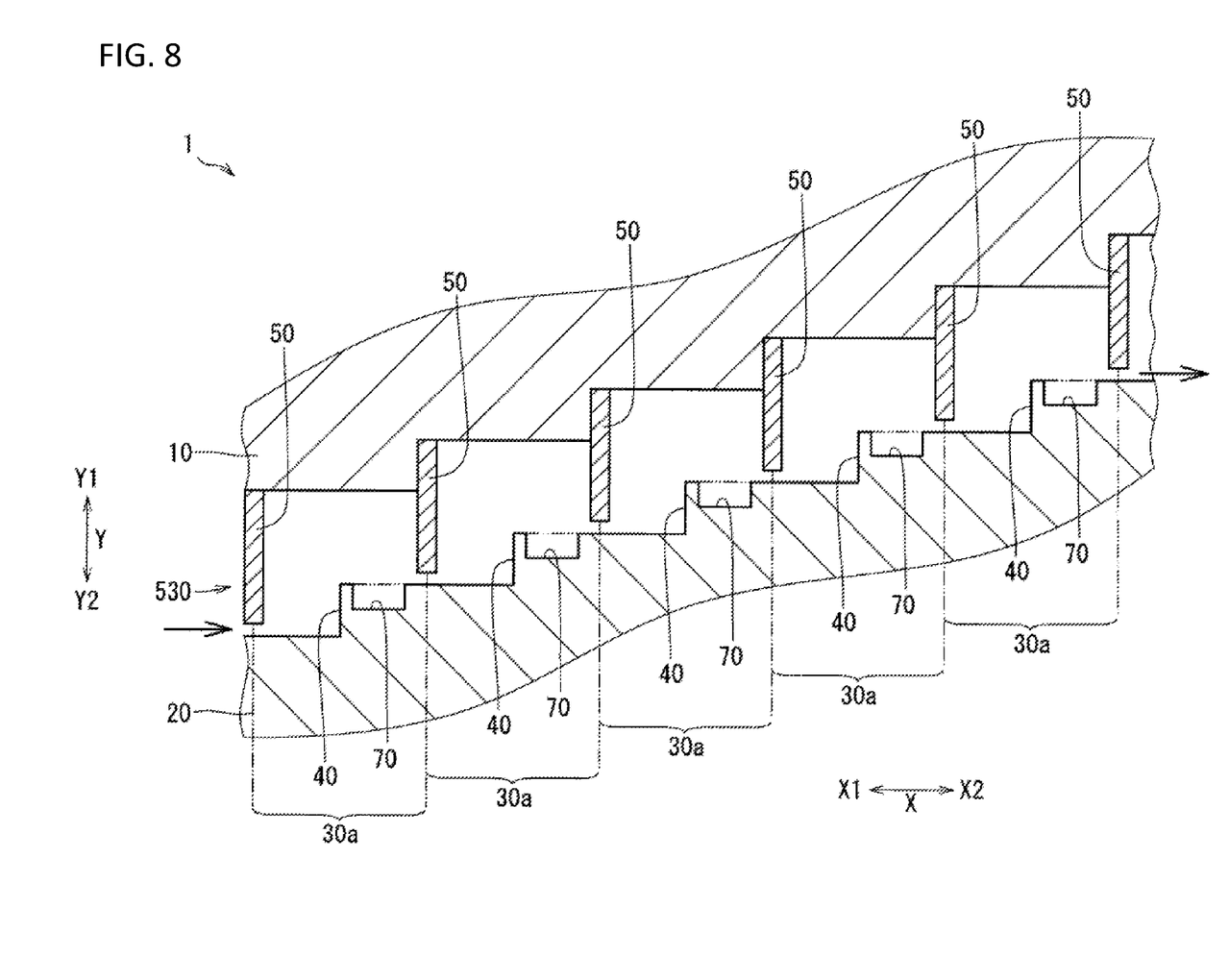
FIG. 8 is a cross-sectional view of a labyrinth seal and the like according to a fifth embodiment.

A labyrinth seal 530 of the fifth embodiment is described by referring to FIG. 8.

The labyrinth seal 530 includes a plurality of unit structures 30a, each of which is the same as the unit structure 30a illustrated in FIG. 1. As illustrated in FIG. 8, for example, the number of unit structures 30a is 5, and the number may be changed. The unit structures 30a are arranged side by side in the flow direction X, arranged continuously in the flow direction X, or arranged adjacent to each other in the flow direction X. Further, the unit structure 30a may be modified as any one of the second to fourth embodiments.

Eighth Effect of the Invention

The effect based on the labyrinth seal 530 illustrated in FIG. 8 is as follows.

[Configuration 8]

A plurality of structures (unit structures 30a) are arranged side-by-side in the flow direction X, each structure including the step portion 40, the high-pressure-side fin 51, the low-pressure-side fin 52, and the annular groove 70.

According to [Configuration 8] above, as compared with the case where one unit structure 30a is provided, leakage of the fluid in the gap 25 can be further prevented.

(Modifications)

Each of the embodiments above may be variously modified. A part of the constituent elements of the embodiment(s) above may not be provided. The number of constituent elements of the embodiment(s) above may be changed. Constituent elements of the embodiment(s) different from each other may be combined. For example, at least either the high-pressure-side slant portion 470e or the low-pressure-side slant portion 470f illustrated in FIG. 7 may be added to the annular groove 70 having the arc-shaped portion 370d illustrated in FIG. 6.

This application is based on Japanese Patent Application No. 2016-201949 filed on Oct. 13, 2016, the contents of which are incorporated herein by reference.

DESCRIPTION OF REFERENCE NUMERALS AND SIGNS

1: Rotary machine
10: Stationary body (first member)
20: Rotary body (second member)
25: Gap
30, 230, 330, 430, 530: Labyrinth seal
40: Step portion
50: Fin
51: High-pressure-side fin
52: Low-pressure-side fin
70: Annular groove
370d: Arc-shaped portion
470e: High-pressure-side slant portion (slant portion)
470f: Low-pressure-side slant portion (slant portion)
X: Flow direction
X1: High-pressure side
X2: Low-pressure side
Y: Facing direction
Y1: One side of facing direction
Y2: Other side of facing direction

The invention claimed is:

1. A labyrinth seal for use in a rotary machine, the labyrinth seal comprising:
a first member;
a second member facing the first member; and
a gap formed between the first member and the second member and configured to allow a fluid to flow from a high-pressure side to a low-pressure side in a flow direction that is a direction perpendicular to a direction where the first member and the second member face each other, wherein,
in a facing direction which is the direction where the first member and the second member face each other, a side of the first member relative to the second member is defined as one side of the facing direction, and
in the facing direction, a side of the second member relative to the first member is defined as an other side of the facing direction,
a step portion formed in a portion of the second member on the other side of the facing direction and facing the high-pressure side;
a high-pressure-side fin arranged on the high-pressure side relative to the step portion and extending from a portion of the first member on the one side of the facing direction toward the other side of the facing direction;
a low-pressure-side fin arranged on the low-pressure side relative to the step portion and extending from a portion of the first member on the one side of the facing direction toward the other side of the facing direction; and
an annular groove formed in a portion of the second member on the other side of the facing direction and arranged in at least a part of a region on the low-pressure side relative to the step portion as well as on the high-pressure side relative to the low-pressure-side fin, wherein the annular groove includes a slant portion formed in at least one of a portion of the annular groove on the high-pressure-side and a portion of the annular groove on the low-pressure-side and a flat bottom surface extending along the flow direction; and an end of the slant portion on the other side of the facing direction is a point on the flat bottom surface and is located close to a center side of the annular groove in the flow direction relative to an other end of the slant portion on the one side of the facing direction, wherein the following relationship is satisfied:

$1.0 > D/H > 0.6$, wherein H is a maximum height of the step portion in the facing direction, and D is a maximum depth of the annular groove in the facing direction.

2. The labyrinth seal according to claim 1,
wherein a cross-section of a bottom of the annular groove as viewed from a direction perpendicular to each of the facing direction and the flow direction has a generally concave protruding toward the other side of the facing direction.

3. The labyrinth seal according to claim 1, wherein the following relationship is satisfied:

$0 < L/G < 1.2 + T/G$, wherein L is a distance in the flow direction from the step portion to a portion which is an end of the annular groove on the other side of the facing direction and the end of the annular groove on the low-pressure-side, G is a distance in the flow direction from the step portion to a portion which is a distal end of the low-pressure-side fin and the end of the low-pressure-side fin on the high-pressure-side, and T is a width of the distal end of the low-pressure-side fin in the flow direction.

4. The labyrinth seal according to claim 3, wherein the following relationship is satisfied:

$0.6 < L/G < 1.2 + T/G$.

5. The labyrinth seal according to claim 1,
wherein a first structure including the high-pressure-side fin, the step portion, the annular groove, and the low-pressure-side fin arranged in this order along the flow direction, and a second structure, substantially identical to the first structure and arranged side-by-side with respect to the first structure in the flow direction, the second structure including a second high-pressure-side fin, a second step portion, a second annular groove, and a second low-pressure-side fin arranged in this order along the flow direction.

6. A labyrinth seal for use in a rotary machine, the labyrinth seal comprising:

a first member;

a second member facing the first member; and a gap formed between the first member and the second member and configured to allow a fluid to flow from a high-pressure side to a low-pressure side in a flow direction that is a direction perpendicular to a direction where the first member and the second member face each other, wherein, in a facing direction which is the direction where the first member and the second member face each other, a side of the first member relative to the second member is defined as one side of the facing direction, and in the facing direction, a side of the second member relative to the first member is defined as an other side of the facing direction, a step portion formed in a portion of the second member on the other side of the facing direction and facing the high-pressure side;

a high-pressure-side fin arranged on the high-pressure side relative to the step portion and extending from a portion of the first member on the one side of the facing direction toward the other side of the facing direction;

a low-pressure-side fin arranged on the low-pressure side relative to the step portion and extending from a portion of the first member on the one side of the facing direction toward the other side of the facing direction; and an annular groove formed in a portion of the second member on the other side of the facing direction and arranged in at least a part of a region on the low-pressure side relative to the step portion as well as on the high-pressure side relative to the low-pressure-side fin, wherein the following relationship is satisfied:

$0 < L/G < 1.2 + T/G$, wherein L is a distance in the flow direction from the step portion to a portion which is an end of the annular groove on the other side of the facing direction and the end of the annular groove on the low-pressure-side, G is a distance in the flow direction from the step portion to a portion which is a distal end of the low-pressure-side fin and the end of the low-pressure-side fin on the high-pressure-side, and T is a width of the distal end of the low-pressure-side fin in the flow direction, and wherein the following relationship is satisfied:

$1.0 > D/H > 0.6$, wherein H is a maximum height of the step portion in the facing direction, and D is a maximum depth of the annular groove in the facing direction.

7. The labyrinth seal according to claim 6,
wherein a distal end of the low-pressure-side fin is arranged on the high-pressure side relative to a proximal end of the low-pressure-side fin.

* * * * *